FABRICATION OF REFRACTIVE BLAZED HOLOGRAMS

[15] 3,680,945
[45] Aug. 1, 1972

Sheridon

[54] FABRICATION OF REFRACTIVE BLAZED HOLOGRAMS

[72] Inventor: Nicholas K. Sheridon, Fairport, N.Y.

[73] Assignee: Xerox Corporation, Stamford, Conn.

[22] Filed: Oct. 23, 1970

[21] Appl. No.: 83,403

[52] U.S. Cl. ................... 350/3.5, 96/27 H, 264/1, 350/162 R
[51] Int. Cl. ............................................. G02b 27/22
[58] Field of Search ............ 350/3.5, 162 R; 96/27 H; 264/1

[56] References Cited

FOREIGN PATENTS OR APPLICATIONS 1,139,955   1/1969   Great Britain ................. 350/3.5

OTHER PUBLICATIONS

Sheridon, 12 Applied Physics Letters 316– 318 (5/1968)
Kurtz, 58 J. Opt. Soc' y Am. 856– 857 (6/1968)
Sherman, 6 Applied Optics 1749– 1753 (10/1967)
Belvaux, XXII Annales de Radioelectricite 105– 108 (with translation) (4/1967)

*Primary Examiner*—David Schonberg
*Assistant Examiner*—Robert L. Sherman
*Attorney*—James J. Ralabate, John E. Beck, Franklyn C. Weiss and David C. Petre

[57] ABSTRACT

Methods and apparatus for fabricating refractive blazed holograms having high single image diffraction efficiencies. A reflective blazed hologram made with a single wavelength light source may be modified for high blazed efficiencies at any desired wavelength. A reflective blazed hologram surface is replicated onto the surface of a material of higher refractive index, with a shorter wavelength of light utilized fore reconstruction. A further embodiment is to replicate a reflective blazed hologram onto the surface of a material that can be made to undergo an isotropic dimension increase or decrease. When the desired dimension change has taken place, the blazed surface thereof would again be replicated onto the surface of a suitable transparent material of the proper refractive index. Thus, refractive blazed holograms blazed for any wavelength can be obtained.

18 Claims, 2 Drawing Figures

INVENTOR.
NICHOLAS K. SHERIDON

BY Franklyn C. Weiss
ATTORNEY 3,680,945

FABRICATION OF REFRACTIVE BLAZED HOLOGRAMS

BACKGROUND OF THE INVENTION

Prior art imaging techniques include that of holography which, through special exposure techniques on a photosensitive layer such as a photographic film, produces an image recording which, when re-illuminated with a similar coherent light source, gives a three-dimensional image to a viewer. A hologram may be made, for example, by directing a portion of radiation from a laser source or other source of coherent light radiation at or through an object to be holographed and providing a separate portion of the radiation, called a reference beam, by various mirror and/or lens arrangements, or otherwise providing for a separate beam that is coherent with the beam of light illuminating the object, and then positioning the imaging member, typically photographic film, so that it receives both the object modulated radiation and the reference beam. The film will then record the intensity of the sum of the two fields, i.e., will record the stationary interference pattern between the two fields. Subsequently, the interference pattern developed upon the recording surface may be utilized in reconstruction of the object modulated wavefront, typically to produce a viewable image of the object by suitably directing a beam similar to the reference beam at the hologram.

Most prior art holograms are constructed with the object and reference beams impinging upon the holographic plate from the same side of the plate. A hologram produced by directing the object modulated beam through opposite sides of the photosensitive layer was first described by Denisyuk in the Soviet Physics-Doklady, No. 7, page 543 (1962). This hologram consists of recorded interference patterns which are nearly parallel surfaces and which are approximately one-half wavelength of light apart and which are typically nearly parallel to the surfaces of the photosensitive layer. The wavefronts from which an image of the holographed object can be formed are reconstructed by passing an illumination beam similar to the reference beam through the hologram. The present Applicant in copending Application No. 728,986, filed May 14, 1968 now U.S. Pat. No. 3,580,657, improved upon Denisyuk's technique by providing a photo-hardenable imaging member, imaging a standing optical wavefield in and on said photosensitive member and developing the exposed member to preferentially dissolve either relatively exposed or unexposed portions of the member (depending on the type of photo-hardenable material used) to produce a surface relief blazed holographic recording.

Blazed holograms are generally then coated with a highly reflective material on the surface relief side of the hologram. Upon reconstruction, a coherent light source is impinged upon the reflective surface and the holographic image in the +1 diffractive order may be viewed or photographed in any of the prior art manners. To be fully productive, a hologram, to make use of the many prior art techniques of projection, should be utilized in refraction rather than reflection. However, a blazed hologram will produce a high efficiency diffracted image in the +1 order by a reflection of coherent light from the blazed surface, but the same reconstruction coherent light source when refracted through the hologram will divide the light rather symmetrically into various image orders, thereby reducing the reconstruction efficiency of the hologram for a single image.

To reiterate, blazed holograms to date have been described as only useful in reflection. That is, a coherent wavefront reflected from one will receive the distribution of the phase change characteristics of the hologram, and most of the reflected light will be diffracted into a single image. In transmission, i.e. refraction, however, the phase change is considerably distorted, causing among other things the transmitted light energy to be divided rather symmetrically among numerous images.

OBJECTS OF THE INVENTION

It is, accordingly, an object of the present invention to provide for the fabrication of refractive blazed holograms having high single image diffraction efficiencies.

It is another object of the present invention to increase the efficiency of recording information in a blazed holographic recording system.

It is another object of the present invention to fabricate blazed holograms with high blazed efficiencies at any desired wavelength from a blazed hologram constructed with a single wavelength of light.

BRIEF SUMMARY OF THE INVENTION

In accomplishing the above and other desired aspects of the present invention, Applicant has invented improved apparatus and methods for blazed holographic information recording. In a first embodiment, a reflective blazed hologram of one constructing blaze wavelength is replicated onto the surface of a material having a different refractive index to form a refractive blazed hologram having a different blaze wavelength. A second embodiment replicates a reflective blazed hologram onto the surface of a material that can be made to undergo an isotropic dimension change. Depending upon the material to be used, a refractive blazed hologram blazed for any wavelength can be obtained. A third embodiment of the invention illustrates the replication of a reflective hologram onto a material which is isotropically expanded or shrunk, the ratio of the second wavelength to the first wavelength being the factor of multiplication thereof.

BRIEF DESCRIPTION OF THE DRAWINGS

For a better understanding of the invention as well as other objects and further features thereof, reference is made to the following detailed description taken in conjunction with the accompanying drawings wherein.

DETAILED DESCRIPTION OF THE INVENTION

As hereinabove set forth, Yu N. Denisyuk introduced the concept of a hologram produced by exposing a thick photographic emulsion to a standing optical wavefield. The standing wavefield was created by allowing light reflected from an object to interfere with a reference beam propagating in the opposite direction. The photographic emulsion recorded the antinodal surfaces of the wavefield as silver deposits in the emulsion volume. These silver deposits served as reflection surfaces for the reconstruction of the object wavefield.

In Applied Physics Letters, Volume 12, No. 9, May 1, 1968, pages 316 to 318, the present inventor pointed out that adjacent standing wave surfaces are about one-half wavelength apart and are nearly identical in shape. It may then be expected that boundary conditions equivalent to a single isolated standing wave surface can be obtained by isolating the fragments of standing wave surfaces located in the volume of space between two parallel planes spaced approximately one-half wavelength apart. Such a hologram is in effect blazed, and like a blazed diffraction grating, reflects a maximum amount of light into a single diffraction order. Its groove shape follows sections of the standing wave surfaces as is shown schematically in said copending Application No. 728,986, in the name of the present inventor and assigned to the same assignee as the present application. This copending patent application disclosed that blazed holograms can be produced by exposing a thin, high resolution photoresist layer coated on glass. The development process for photoresist materials involved the preferential dissolution of either exposed or unexposed portions, depending on the type of photoresist material used, in the developer liquid. Hence, only the standing wave surfaces in the outer half wavelength thick layer of the photoresist are isolated. Dissolution to a greater depth is prevented by the insolubility of the already isolated standing wave surfaces.

Said copending application further discloses that when coated with aluminum or other suitably reflective metal, the collimated beam holograms behave like good blazed diffraction gratings. For 4,880 angstrom light (the same as used in the exposure), they diffract at least 73 percent of the reflected light into the +1 order, 26 percent into the 0 order and less than 1 percent into the −1 order. As the blazed surfaces are approximately one-half wavelength apart, a wavefront reflected from such a surface will undergo abrupt phase changes of one wavelength between adjacent blazed surfaces, in addition, to the phase introduced by the surfaces themselves. Thus, contributions from all blazed surface segments will add in phase to produce an image.

Figure 1A:
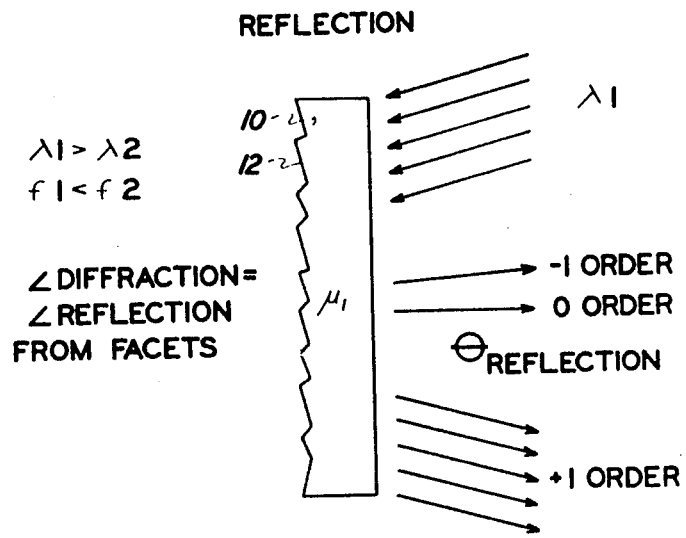
FIGS. 1A and 1B show the reflective and refractive principles in accordance with the present invention.

Light transmitted through an uncoated, as opposed to one coated with aluminum, for example, blazed hologram can be made to undergo a phase change of one wavelength between adjacent blaze surfaces. When this is done, light contributions from all blazed surface segments will add in phase to produce an image, and thus is produced a refractive blaze hologram. As seen in FIG. 1A, a coherent light source of wavelength $\lambda_1$ is impinged upon the transparent substrate 10, upon which has been formed a blazed surface 12. This substrate will have a refractive index of $\mu_1$. The inherent characteristics of the blazed hologram seen in FIG. 1A will cause most of the diffracted light to appear in the +1 order. For maximum efficiency in a reflective blazed hologram it is advantageous to have the angle of diffraction coincident with the angle of reflection from the facets on the blazed surface. However, in a refractive instance for a given wavelength, when the reflective situation is optimum, the phase change is considerably distorted, causing among other things the transmitted light energy to be divided rather symmetrically among numerous images.

For optimum performance for a given wavelength in a refractive situation with a blazed hologram, it is advantageous to have the angle of diffraction (measured with respect to the hologram plane) coincident with the angle of refraction from the facets on the blazed surface. Thus, one method of producing a refractive blazed hologram from a reflective blazed hologram is to replicate the reflective blazed surface onto the surface of a material of higher refractive index, and to use a shorter wavelength of light in reconstruction. Thus, considering normal incidence, a reflective blazed hologram of blaze wavelength $\lambda_1$ and diffraction angle $\theta_1$, can be replicated onto the surface of a material of refractive index $\mu_2$ to form a refractive blazed hologram having a blazed wavelength $\lambda_2$ and diffraction angle $\theta_2$ in the relation as follows:

$$\frac{\lambda_2}{(\mu_2 - \cos\theta_2)} = \frac{\lambda_1}{(1 + \cos\theta_1)}$$

Images from reflective blazed holograms can be reconstructed by reflecting light either from the air side or from the substrate side of the blazed surface. Because the wavelength is longer in air than in the substrate the hologram will be blazed for different wavelengths in the two cases. For purposes of illustrating the principles of this invention in the simplest manner the equation shown above and all subsequent equations assume the image is being reconstructed by reflecting light from the air side of the blazed surface, where the refractive index is 1.

Figure 1B:
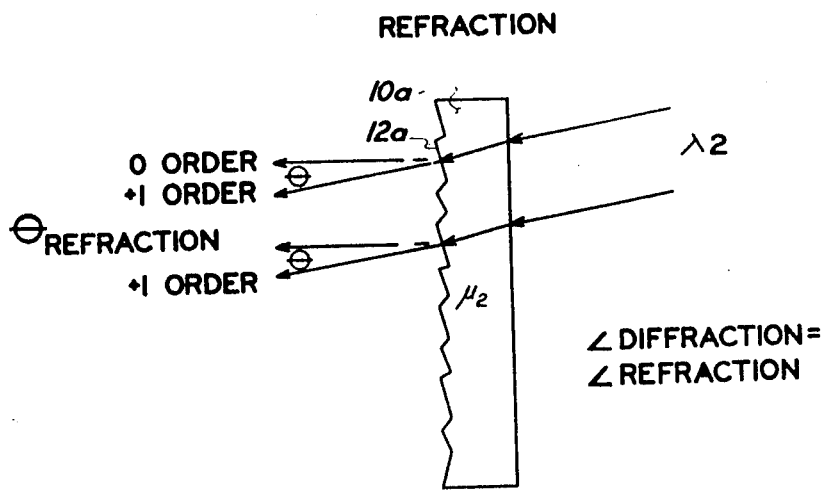

FIG. 1B shows the relationship of the refractive blazed hologram constructed from a reflective blazed hologram. Thus, a coherent light source of a different wavelength $\lambda_2$ is impinged upon the substrate 10A of refractive index $\mu_2$. In order to allow the light image from the blazed surface 12A to mostly appear in the +1 order, the angle $\theta$ between the 0 order and +1 order as shown must be the same as the angle of refraction taken with respect to the normal to the surface. For a given wavelength $\lambda_2$ this situation will only occur after the original substrate has been replicated onto a substrate of sufficiently high refractive index $\mu_2$.

Another method of producing refractive blazed holograms is to replicate a reflective blazed hologram as seen in FIG. 1A, onto the surface of a material that can be made to undergo an isotropic dimension change. That is, numerous materials can be made to increase or decrease greatly in size when exposed to certain vapors or radiation or when immersed in certain liquids. When the desired dimension change has taken place, the surface could again be replicated into the surface of a suitable transparent material of the proper refractive index. In this way, refractive blazed holograms blazed for any wavelength could be obtained. Considering normal incidence a reflection blazed hologram of blaze wavelength $\lambda_1$ and diffraction angle $\theta_1$, for example, can be replicated onto the surface of an expandable material, the latter expanded, or shrunk, by a factor of M, and this surface replicated onto the surface of a material of refraction index $\mu_2$. The blaze wavelength of this refractive blazed hologram will be $\lambda_2$ and the angle of diffraction will be $\theta_2$. thus, it can be shown that:

$$\frac{\lambda_2}{M(\mu_2 - \cos\theta_2)} = \frac{\lambda_1}{(1 + \cos\theta_1)}$$

Thus, what is obtained is a refractive hologram with the same information as the original reflective hologram but now the new hologram can be very efficiently reconstructed with a transmissive light beam of possibly different wavelength. As is the case in the first embodiment, for a given wavelength, the reflective hologram is not efficient when used for refraction, and the refraction hologram is not now efficient for use in reflection.

On occasion, it is desired to produce a hologram at one frequency while it is desired to reproduce the hologram and the image thereon at a different frequency. However, the different frequency may be in a range where no coherent light source is available to illuminate the blazed hologram. For example, an arc lamp of lesser coherence may be used for reconstruction, the frequency of which may be such that no laser source exists. Further, the new hologram may be used as a spectrograph to detect a certain wavelength in a refracted light source. Thus, a reflective hologram blazed for wavelength $\lambda_1$ can be replicated onto the surface of a material which is later isotropically expanded, or shrunk, by a factor M. This new hologram and its replica are now blazed in reflection for a wavelength $\lambda_2$ and for the same angle of diffraction by the following relationship:

$$M = \frac{\lambda_2}{\lambda_1}$$

This situation only works for a reflective to reflective holographic situation, i.e., the refractive indices of the substrates are not a factor here due to the fact that the blazed surface would be coated with a high efficiency light reflecting material.

The isotropic expanding or contracting material would be, for example, the RTV rubbers manufactured by General Electric which have been used successfully to replicate surface relief holograms. It has been found that these rubbers may be expanded isotropically and with high fidelity by immersing them in liquids such as carbon tetrachloride. Thus, the above embodiments may utilize such a material by first replicating a blazed hologram onto an RTV rubber by flowing the uncured rubber over the blazed surface. The cured rubber is then stripped off and immersed in a solvent, such as the carbon tetrachloride, for example. After a predetermined period of time to ensure desired expansion, the blazed surface is replicated again onto another substrate. In a refractive situation, the index of refraction of the new substrate would be predetermined, while for a reflective situation the blazed surface may be coated with a mirror surface, the refractive index of the substrate being of no relevancy if the light were not passed through the supporting base.

In the foregoing there has been disclosed methods and apparatus for effectively utilizing holographic principles in the construction of blazed holograms for refraction and for unavailable light source wavelengths. The use of transmission blazed holograms greatly enhances their potential application as optical imaging elements over the reflective blazed holograms as set forth above in the copending application. While the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. The method of producing a refractive blazed hologram comprising the steps of:
   providing a reflective blazed hologram on a first substrate with a first refractive index, wherein the angle of reflection from the facets of the blazed surface is coincident with the angle of diffraction for the reflection blazed wavelength, and replicating said reflective blazed hologram into a second substrate with a second refractive index wherein the angle of diffraction is coincident with the angle of refraction from facets of the blazed surface structure for the refractive blazed wavelength.

2. The method as set forth in claim 1 further including:
   illuminating said blazed hologram on said second substrate with a light beam of a different wavelength than utilized to construct said reflective blazed hologram.

3. The method as set forth in claim 2 wherein said second refractive index is higher than said first refractive index and wherein said step of illuminating comprises:
   reconstructing the holographic image on said refractive blazed hologram by transmitting said second wavelength light beam through said refractive hologram, said second wavelength light beam being shorter in wavelength than said first wavelength light beam, and wherein said first and said second wavelengths correspond to the following relationship:

$$\frac{\lambda_2}{(\mu_2 - \cos\theta_2)} = \frac{\lambda_1}{(1 + \cos\theta_1)}$$

where $\lambda_1$ is the blaze wavelength of said reflective blazed hologram having a diffraction angle $\theta_1$ for normal incidence, $\lambda_2$ is the blaze wavelength of said refractive blazed hologram having a diffraction angle $\theta_2$ for normal incidence and $\mu_2$ is said second refractive index.

4. The blazed surface product of claim 1.

5. The method of producing a refractive blazed hologram comprising the steps of:
   replicating a reflective blazed hologram on a first substrate with a first refractive index onto a material that can be made to undergo an isotropic dimension change, and
   activating said isotropic dimension change in said material, and
   further replicating said blazed surface or said material of changed dimension onto a second substrate with a second refractive index wherein said reflective blazed hologram and said refractive blazed hologram have the following relationship:

$$\frac{\lambda_2}{M(\mu_2 - \cos\theta_2)} = \frac{\lambda_1}{(1 + \cos\theta_1)}$$

wherein $\lambda_1$ is the blaze wavelength of said reflective blazed hologram having a diffraction angle $\theta_1$ for normal incidence, $\lambda_2$ is the blaze wavelength of said refractive blazed wavelength having a diffraction angle $\theta_2$ for normal incidence, $\mu_2$ is said second refractive index and M is the factor of dimension change.

6. The method as set forth in claim 5 wherein said step of activating comprises:
exposing said material to vapors of activating fluids.

7. The method as set forth in claim 5 wherein said step of activating comprises:
exposing said material to activating radiation.

8. The method as set forth in claim 5 wherein said step of activating comprises:
immersing said material in an activating liquid such as a solvent.

9. The method as set forth in claim 5 further including:
directing through said second substrate a reconstruction beam of coherent radiation of different wavelength than the construction beam of said reflective blazed hologram in order to transmit the holographic image thereon.

10. The method as set forth in claim 9 wherein said step of directing includes the step of reconstructing said holographic image according to the following relationship:

$$\frac{\lambda_2}{M(\mu_2-\cos\theta_2)} = \frac{\lambda_1}{(1+\cos\theta_1)}$$

where M is the factor of dimension change, $\lambda_1$ is said wavelength of said construction beam forming a hologram having a diffraction angle $\theta_1$ for normal incidence, $\lambda_2$ is said wavelength of said reconstruction beam diffracted at angle $\theta_2$, and $\mu_2$ is said second refractive index.

11. The method of producing a reflective hologram blazed at a second light wavelength from a reflective hologram blazed at a first light wavelength comprising the steps of:
replicating said first reflective hologram blazed at said first light wavelength onto a material that can be made to undergo an isotropic dimension change,
activating said isotropic dimension change in said material, and
further replicating said blazed surface on said material of changed dimension onto a surface to form said reflective blazed hologram blazed at said second light wavelength wherein the blaze wavelengths of said reflective holograms have the following relationship:

$$M=\frac{\lambda_2}{\lambda_1}$$

where $\lambda_1$ is the blaze wavelength of said first reflective hologram, $\lambda_2$ is the blaze wavelength of said second reflective hologram and M is the factor of dimension change.

12. The method as set forth in claim 11 further including:
coating said blazed surface of said second reflective hologram with a high efficiency light reflecting material.

13. The blazed surface product of the method of claim 11.

14. The blazed surface product of the method of claim 12.

15. The method as set forth in claim 11 further including:
reconstructing the holographic image on said second reflective hologram according to the following relationship:

$$M=\frac{\gamma_1}{\gamma_2}$$

where M is the factor of dimension change, $\lambda_1$ is said first light wavelength, and $\lambda_2$ is said second light wavelength.

16. A reconstruction imaging method comprising the steps of:
a. directing an object modulated beam of coherent radiation at one face of a photohardenable layer with a first refractive index;
b. further directing a reference beam of coherent radiation, coherent with the coherent radiation of said object modulated beam, at the other face of said layer to create a standing wave pattern in and at one face of said layer to create a corresponding change in and at said one face of said layer in resistence to a solvent;
c. subjecting said one face of said layer to a solvent for the relatively less hardened portions of said layer to create a blazed surface on said layer;
d. replicating said blazed surface into the surface of a second layer with a second refractive index; and
e. further directing through said second layer a reconstruction beam of coherent radiation of different wavelengths than said object modulated and reference beams to transmit the holographic image thereon.

17. The method as set forth in claim 16 wherein the step of replicating comprises:
further replicating said blazed photohardenable layer surface onto a material that can be made to undergo an isotropic dimension change,
activating said isotropic dimension change in said material and
further replicating said blazed surface on said material of changed dimension onto said surface of said second layer with said second refractive index, wherein said blazed surface layer having a first refractive index and said blazed surface layer having a second refractive index have the following relationship:

$$\frac{\lambda_2}{M(\mu_2-\cos\theta_2)} = \frac{\lambda_1}{(1+\cos\theta_1)}$$

wherein $\lambda_1$ is the blaze wavelength of said blazed surface having a first refractive index having a diffraction angle $\theta_1$ for normal incidence, $\lambda_2$ is the blaze wavelength of said blazed surface having a second refractive index having a diffraction angle $\theta_2$ for normal incidence, $\mu_2$ is said second refractive index and M is the factor of dimension change.

18. The method of producing a refractive blazed hologram comprising the step of:
replicating a reflective blazed hologram on a first substrate with a first refractive index into a second substrate with a second refractive index, wherein said second refractive index is higher than said first refractive index, wherein the blaze wavelength of said refractive blazed hologram is shorter than the blaze wavelength of said reflective blazed hologram and said refractive blazed hologram and said reflective blazed hologram have the following relationship:

$$\frac{\lambda_2}{(\mu_2 - \cos\theta_2)} = \frac{\lambda_1}{(1 + \cos\theta_1)}$$

where $\lambda_1$ is the blaze wavelength of said reflective blazed hologram having a diffraction angle $\theta_1$ for normal incidence, $\lambda_2$ is the blaze wavelength of said refractive blazed hologram having a diffraction angle $\theta_2$ for normal incidence and $\mu_2$ is said second refractive index.

* * * * *

UNITED STATES PATENT OFFICE
CERTIFICATE OF CORRECTION

Patent No. 3,680,945   Dated August 1, 1972

Inventor(s) Nicholas K. Sheridon

It is certified that error appears in the above-identified patent and that said Letters Patent are hereby corrected as shown below:

Column 3, Line 52, "blaze" should read ---blazed---.

Column 4, Line 45, after "$\mu_2$" insert ---or the wavelength $\lambda_2$ is sufficiently short compared with $\lambda_1$---.

Claim 5, Line 9, "or" should read ---on---.

Column 7, Line 2, "wavelength" should read ---hologram---.

Claim 15, Lines 7-8, the equation "$M=\frac{\gamma_1}{\gamma_2}$" should read ---$M=\frac{\lambda_2}{\lambda_1}$---.

Signed and sealed this 26th day of June 1973.

(SEAL)
Attest:

EDWARD M. FLETCHER, JR.
Attesting Officer

ROBERT GOTTSCHALK
Commissioner of Patents